US012770761B2

(12) United States Patent
Ballarino et al.

(10) Patent No.: US 12,770,761 B2
(45) Date of Patent: Oct. 20, 2026

(54) CABLE COMPRISING SUPERCONDUCTIVE TAPE

(71) Applicant: CERN—EUROPEAN ORGANIZATION FOR NUCLEAR RESEARCH, Geneva (CH)

(72) Inventors: Amalia Ballarino, Geneva (CH); Christian Barth, Veigny-Foncenex (FR)

(73) Assignee: CERN—EUROPEAN ORGANIZATION FOR NUCLEAR RESEARCH, Geneva (CH)

( * ) Notice: Subject to any disclaimer, the term of this patent is extended or adjusted under 35 U.S.C. 154(b) by 207 days.

(21) Appl. No.: 18/433,155

(22) Filed: Feb. 5, 2024

(65) Prior Publication Data

US 2025/0336569 A1 Oct. 30, 2025

(51) Int. Cl.

*H01B 12/00* (2006.01)
*H01B 12/06* (2006.01)
*H01B 12/08* (2006.01)
*H01B 13/08* (2006.01)

(52) U.S. Cl.

CPC ............. *H01B 12/08* (2013.01); *H01B 12/06* (2013.01); *H01B 13/0866* (2013.01)

(58) Field of Classification Search

CPC ..... H01B 12/08; H01B 12/06; H01B 13/0866
See application file for complete search history.

(56) References Cited

U.S. PATENT DOCUMENTS

2002/0153162 A1 10/2002 Spreafico
2003/0159847 A1* 8/2003 Adrian .................. H01B 12/02 174/106 R
2003/0183410 A1* 10/2003 Sinha .................... H01B 12/06 174/68.1
2005/0236175 A1 10/2005 Reis
2012/0015815 A1 1/2012 Allais et al.
2012/0214675 A1 8/2012 Van Der Laan
2022/0301744 A1 9/2022 WillÉn et al.

FOREIGN PATENT DOCUMENTS

WO WO-2012042189 A1 * 4/2012 ............... H02G 9/00
WO WO-2022244409 A1 * 11/2022 ............. H01B 12/08

OTHER PUBLICATIONS

KR20240056068 A; published on Apr. 30, 2024; English translation (Year: 2022).*
Partial European Search Report for EP Application No. 24220808 dated May 30, 2025, pp. 1-14.

(Continued)

*Primary Examiner* — Pete T Lee
(74) *Attorney, Agent, or Firm* — Stoel Rives LLP

(57) ABSTRACT

Cables comprising a flexible core and formed of wound superconducting tape wrapped helically around the flexible core, as well as methods of producing such cables are disclosed. The superconducting tape is wrapped around a conductive layer comprising conductive material, providing mechanical cushioning and electrical stabilization for the superconducting material. When producing such cables, tension control techniques support the protection of the superconducting tape and hence degradation of the superconducting material is largely or entirely avoided.

19 Claims, 10 Drawing Sheets

(56) References Cited

OTHER PUBLICATIONS

Extended European Search Report for EP Application No. 24220808 dated Sep. 1, 2025, pp. 1-15.

Anonymous: “Taper Tension Control | Daco Solutions”, Jan. 17, 2013 (Jan. 17, 2013), XP093305364, Retrieved from the Internet: URL:https://www.daco-solutions.com/automatic-tension-control/, pp. 1-3.

* cited by examiner

CABLE COMPRISING SUPERCONDUCTIVE TAPE

TECHNICAL FIELD

The present disclosure relates to superconducting cabling. In particular, the present disclosure relates to conductive cabling comprising superconducting tape.

DESCRIPTION

Cables made from High Temperature Superconductors (HTS) may be used in a wide variety of applications, such as electrical transmission, magnets, superconducting magnetic energy storage (SMES), motors, and other superconducting devices. However, HTS are made from brittle materials, meaning that limitations on the maximum stress/strain (well below the yield point of the constituent metals) have to be respected, in order to avoid degradation of the properties of the HTS, such as limitations in its current carrying capability.

SUMMARY

In one example embodiment described herein there is a cable comprising:

a flexible core;

a conductive layer comprising conductive material; and a superconducting tape wrapped helically around the flexible core and contacting the conductive material.

In one example embodiment described herein there a method of producing the cable, comprising:

controlling a tension at which at least one of:

the superconducting tape;

the conductive layer;

the at least one intermediate conductive layer; and the at least one further superconducting tape is helically wrapped, such that:

the tension decreases through a series of tension set-points as subsequent layers are helically wrapped.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
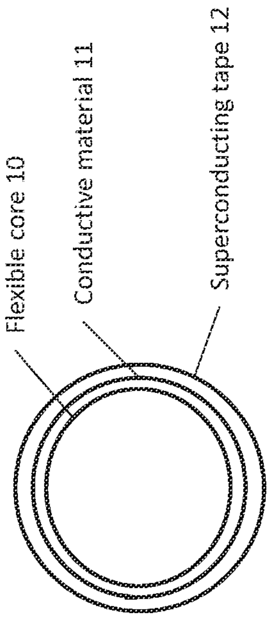
FIG. 1 illustrates in cross-section a cable comprising a flexible core, conductive material, and superconducting tape in accordance with some examples.

Before discussing the embodiments with reference to the accompanying figures, the following description of embodiments is provided.

In accordance with one example configuration there is provided a cable comprising:

a flexible core;

a conductive layer comprising conductive material; and a superconducting tape wrapped helically around the flexible core and contacting the conductive material.

The inventor of the present techniques has realised that whilst it may be desirable to employ superconducting tape for the purpose of constructing a superconducting cable, the fragility of such superconducting tape can impose significant limitations on the kinds of superconducting cable that may be produced and, importantly, the uses to which such a superconducting cable may be put. For example, such superconducting tapes may employ rare-earth barium copper oxide (REBCO) which is produced in the form of a thin (typically about 0.1 mm) tape, with a width varying from few (2-4) mm to typically 12 mm. A typical construction has such a tape formed as a multilayer conductor, incorporating a REBCO layer, which is a few microns thick, deposited onto a metallic substrate. Moreover, wrapping such superconducting tape around a round core may be desirable since the round geometry of the cable that is formed is direction-agnostic in terms of its flexing. Such a cable may then be built up with multiple layers of superconducting tapes helically wrapped around the central core, whereby an electrically insulating layer may form the outermost layer of the cable, and/or one or more electrically insulating layers may be positioned between layers of superconducting tape in order to form an individual or a concentric bi-polar cable, or a multi-circuit cable). Nevertheless, the above-mentioned fragility of the superconducting tape used in such cables must still be respected. In this context the inventor of the present techniques has found that a greatly reduced (or even entirely absent) degradation of the properties of the superconducting tape employed (in particular its critical current) can be achieved in constructing such a cable by providing that, in wrapping the superconducting tape helically around the flexible core, the superconducting material (e.g. REBCO) is better protected against mechanical stress and strain by being directly in contact with a conductive material forming a conductive layer. Such a conductive material not only provides a typically softer substrate onto which the superconducting tape is wrapped, providing physical cushioning and thus reducing the stress/strain to which the superconducting tape is subjected firstly when the cable is being constructed (i.e. during the helical winding of the superconducting tape around the core) and secondly when the cable is bent to fit into its deployed environment, but also supports the electrical stabilization, i.e. current by-pass, of the cable in the event of resistive transition of the superconducting material.

Flexibility is a key feature of the cable, allowing deployment of the cable in a great variety of contexts. The choice of material for the core is therefore significant in order to allow such flexibility. In some examples, the flexible core is metallic. Naturally, the core must be sufficiently flexible to allow the required bending, and in some examples the core is made from a thin stranded copper cable. The flexibility of such a cable also depends on the particular material from which it is made, the tension of the braiding, the braiding twisting, and so on. Moreover an outer layer of insulation also affects the flexibility (which again depends on the particular material for the insulation, its tension, and so on). A benefit of a metallic flexible core is that the material of the core itself provides electrical stabilization. In order to achieve this benefit, it is necessary for there to be excellent, low resistance electrical contact between the superconducting tape and the metallic flexible core. When the outer surface of the metallic flexible core is sufficiently smooth, the superconducting tape may be wrapped directly onto the flexible core and hence in such examples, the conductive layer is an outer layer of the flexible core (i.e. is an arbitrary thickness of the same material of the flexible core defined as the "outer layer"). A metallic flexible core may be provided in a variety of configurations, but in some examples, the flexible core comprises a multi-stranded conductive cable. Furthermore, the electrical contact between the superconducting tape and the flexible metallic core can be improved by metallically coating the core with a suitable metal. In some such examples, the conductive layer is a tinning layer applied to flexible core. In the case of a multi-stranded conductive cable core, the multi-stranded conductive cable may comprise strands that are pre-tinned.

The flexibility of the cable may also be achieved using other material for the core. Moreover, the use of a different material can allow an advantageously lightweight cable to be produced. In some examples, the flexible core is formed of an insulating material. Suitable insulating materials are Kevlar® or Nylon. These materials result in an advantageously lightweight cable, which can be deployed in a range of contexts. Where the flexible core itself is then not conducting, the conductive layer is then necessarily provided by a further material onto which the superconducting tape is helically wrapped. This material of the conductive layer then provides the electrical stabilization of the cable. In some examples, the conductive layer comprises braided metallic wires surrounding the flexible core. In some examples, the conductive layer comprises a metallic tape helically wrapped around the flexible core. The metallic tape may for example be formed of copper. By choice of the material, positioning, spacing and thickness of the braided metallic wires or metallic tape, the electrical stabilization can be adjusted to the target application. Moreover, in such lightweight cables with an insulating flexible core, that core will then typically have a low thermal conductivity (in particular along the cable), which can be of particular benefit in some deployment contexts. For example, for superconducting cables that traverse a significant temperature gradient (such as current leads), a low (longitudinal) thermal conductively is an essential characteristic. Accordingly, this and the weight of the resulting cable can then be carefully tuned to the requirements of the deployment purpose, whether this is a context where weight is the most critical parameter (e.g. in satellite, naval, or aerospace applications) or this is a context where heat transfer parameters are the most critical (e.g. current leads). Non-insulating cores, such as Kevlar® or Nylon, provide a high strength core combined with a low weight, which is very important in uses where the cable has to be mechanically self-supporting to bridge significant vertical distances.

Further, as mentioned above inventor of the present techniques has recognised that the surface quality of the core, in particular its smoothness, needs to be carefully controlled to avoid degradation of the brittle superconducting tape during the helical winding of the construction of the cable and during the bending that occurs when handling and positioning the cable in its deployment. Accordingly, in some examples, a surface roughness of the flexible core has a roughness average value Ra of not more than 3.2 and a mean roughness depth Rz of not more than 325. These constraints apply when there is a superconducting tape wound directly onto the core, however if there is an intervening layer applied between the core and the superconducting tape, that intervening layer may be sufficiently soft that any roughness of the core which exceeds these values can nevertheless be absorbed by the intervening layer.

There may be multiple superconducting tapes making up a superconducting layer of the cable and there may be multiple layers of superconducting tapes helically wrapped around the central core. Thus in some examples, the superconducting tape forms part of a first superconducting layer, and the cable further comprises: at least one intermediate conductive layer surrounding the first superconducting layer; and at least one further superconducting layer wrapped helically around the at least one intermediate conductive layer. Accordingly, each superconducting layer immediately surrounds a conductive layer and thus each superconducting layer is physically cushioned by the adjacent conductive layer and that adjacent layer also provides electrical stabilization for that superconducting layer. This is to be contrasted with an arrangement in which one superconducting layer were to be wrapped directly onto another superconducting layer, which would likely lead to degradation of one or both of the superconducting layers either during the constructional winding of the cable or during the bending of the cable during positioning, due to sliding of the superconducting tapes of the upper superconducting layer and pressing against the uneven outer surface of the lower superconducting layer. This could generate micro-cracks in the superconducting layer, resulting in a reduction in its critical current and n-value. The inventor of the present techniques has found that by the interlaying of a soft, conductive layer between two superconducting layers, such degradation can be avoided.

The material of the intermediate conductive layer(s) may be formed in a variety of ways, but in some examples the at least one intermediate conductive layer comprises further metallic tape helically wrapped around the first superconducting tape. This may for example be thin copper tape. In one example, such copper tape is around 100 μm thick and 12 mm wide. These conductive tapes can then be wrapped with the same twist pitch as the direction of the lower layer without overlap (leaving a small gap between adjacent tape windings of e.g. 0.5 to 2 mm to allow for a small, controlled amount of sliding).

In additional to the superconducting layer(s) and the conductive layer(s), there may also be provided one or more layers of insulating material. This insulating material may be provided as an outermost layer of the cable, and/or one or more electrically insulating layers may be positioned between layers of superconducting tape in order to form an individual or a concentric bi-polar cable, or a multi-circuit cable. Thus in some examples, the superconducting tape forms part of a superconducting layer, and further comprising an insulating layer surrounding the superconducting layer or at least one intermediate conductive layer. In some examples, the insulating layer comprises an insulating tape helically wrapped around the superconducting layer. Polyimide tape is one possibility. In some examples the superconducting tape is one of multiple superconducting tapes forming a first superconducting layer, and the cable further comprises: at least one intermediate conductive layer surrounding the insulating layer; and at least one further superconducting tape wrapped helically around the at least one intermediate conductive layer.

The superconducting tape may be variously formed, but it is commonly formed by the deposition of a few m of superconducting material onto a metallic substrate. The metallic substrate provides support for the superconducting material, yet the superconducting material itself nevertheless remains fragile. In view of this, in prior art superconducting cables, the superconducting material is usually oriented inwards towards the core. This is because during the constructional winding of the tape to form a cable the superconducting material is then subjected to compression, which is more favourable from a mechanical point of view. However, in some examples of the present techniques, the superconducting tape comprises a superconducting layer deposited onto a metallic substrate, wherein the superconducting tape is oriented such that the superconducting layer faces away from the flexible core and the metallic substrate faces towards the flexible core. The buffering provided by the conductive layer around which the superconductive tape is wrapped, together with the surface quality of the core, means that the present techniques are able to orient the superconducting layer outwards (and the metallic substrate inwards).

The above-discussed outward orientation of the superconducting material in a superconducting layer can for example be of particular benefit when forming splices between superconducting tapes. In a prior art arrangement in which all superconducting tapes are oriented with the superconducting layer facing towards the cable core, there is a higher electrical resistance between the respective superconducting layers due to the asymmetry in the geometry of the superconducting tape. By contrast, according to the present techniques a first (inner) superconducting layer can be oriented facing away from the cable core, whilst a second (outer) superconducting layer can be oriented facing towards the cable core, reducing the electrical resistance between the tapes and improving the quality of the electrical splice and facilitating the sharing of current between tapes.

Hence in some examples, the superconducting tape is a first superconducting tape, and the cable further comprises:

an intermediate conductive layer surrounding the first superconducting tape;

a further superconducting tape wrapped helically around the intermediate conductive layer, wherein the further superconducting tape comprises a further superconducting layer deposited onto a further metallic substrate, wherein the further superconducting tape is oriented such that the further superconducting layer faces towards the flexible core and the further metallic substrate faces away from the flexible core.

In accordance with one example disclosed herein there is provided a method of producing the cable in any of the forms according to the present techniques set out above, comprising:

controlling a tension at which at least one of:

the superconducting tape;

the conductive layer;

the at least one intermediate conductive layer; and the at least one further superconducting tape is helically wrapped, such that:

the tension decreases through a series of tension set-points as subsequent layers are helically wrapped.

This approach to the construction of the cable also supports an avoidance of the degradation of the properties of the superconducting material, such as limitations in its current carrying capability, which can result from cracking of the superconductive portion of a superconductive tape.

Particular embodiments will now be described with reference to the figures.

FIG. 1 illustrates a cable in accordance with one example. The cable is shown in cross-section and can be seen to comprise a central, flexible core 10, surrounded by a conductive layer 11 comprising conductive material, and then superconducting tape 12 surrounding and contacting the conductive material. The flexible core 10 may be conductive (e.g. braided copper) or insulating (e.g. Kevlar® or Nylon) and its flexibility provides a useful cable which, also due it its round cross-section, is direction-agnostic in terms of its flexing and can therefore be handled and deployed in a range of contexts. The conductive material 11 may be a distinct, different material to the core 10, as will be the case in the example of an insulating core. Alternatively, in the case of the example of a conductive core, the conductive material 11 can either be a different material to the core or can in fact simply be the same material as the core, indeed in such a case the delineation of the flexible core 10 and the conductive core 11 is arbitrary, i.e. an outermost portion of the conductive core is then considered to be the conductive layer 11. In any configuration, the superconducting tape 12 is then directly in contact with the conductive material 11, ensuring virtually no electrical resistivity between the two and providing the electrical stabilization for the superconducting tape, i.e. current by-pass, in the event of a resistive transition of the superconductor. Further, the flexible core 10 and the conductive layer 11 provide a smooth surface onto which the superconducting tape is helically wrapped. The superconducting tape can consist of any superconducting material, but one example discussed in further detail here uses rare-earth barium copper oxide (REBCO) deposited in a thin (a few microns) layer onto a metallic substrate. The tape formed is itself thin (e.g. 0.1 mm) with a width typically in the range of 2-12 mm. The length of the tape is, by comparison, orders of magnitude longer, depending on the production. The smoothness of the flexible core protects the superconducting tape from small-scale mechanical stress/strain, which could otherwise lead to cracking of the superconducting material and degradation of its superconducting properties. A surface roughness of the flexible core which adheres to the limits of a roughness average value Ra of not more than 3.2 and a mean roughness depth Rz of not more than 325 has been found to sufficiently protect the superconducting tape. Note also that FIG. 1 is not necessarily to scale.

Figure 2:
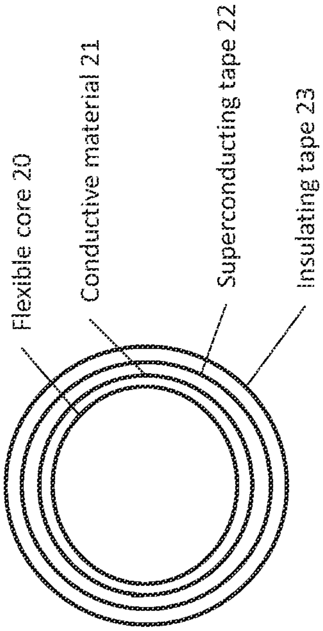
FIG. 2 illustrates in cross-section a cable comprising a flexible core, conductive material, superconducting tape, and insulating tape in accordance with some examples.

FIG. 2 illustrates in cross-section a cable comprising a flexible core 20, conductive material 21, superconducting tape 22, and insulating tape 23 in accordance with some examples. It will be recognised that the construction of the cable shown in FIG. 2 is very similar to that of FIG. 1, where the difference lies in the addition of the outer insulating tape layer 23. Such insulating tape can for example be formed of polyimide. Accordingly, the insulating tape in this example forms the outermost layer of the cable, providing electrical insulation and some mechanical protection for the superconducting tape underneath it. Note also that FIG. 2 is not necessarily to scale.

Figure 3:
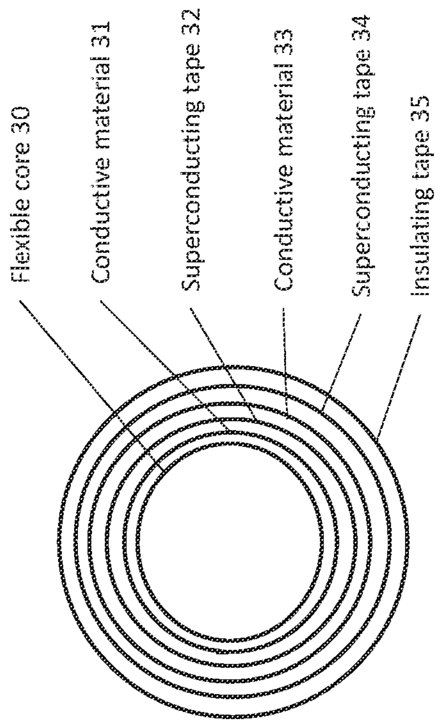
FIG. 3 illustrates in cross-section a cable comprising a flexible core, two consecutive layers of conductive material and superconducting tape, and insulating tape in accordance with some examples.

FIG. 3 illustrates in cross-section a cable comprising a flexible core 30, two consecutive layers of conductive material 31, 33 and superconducting tape 32, 34, and insulating tape 35 in accordance with some examples. Hence this example illustration shows that whilst in some examples there may effective only be one superconducting layer (although possibly composed of multiple concentric wrappings of superconducting tape), it is also disclosed here that multiple superconducting layers can be provided (wherein, again, each is possibly composed of multiple concentric wrappings of superconducting tape). As such, each superconducting layer is then adjacent (on the inward side) to a conductive layer. This serves a dual purpose of providing direct electrical contact for each of the superconducting layers and providing mechanical cushioning for each of the superconducting layers. Note also that FIG. 3 is not necessarily to scale.

Figure 4:
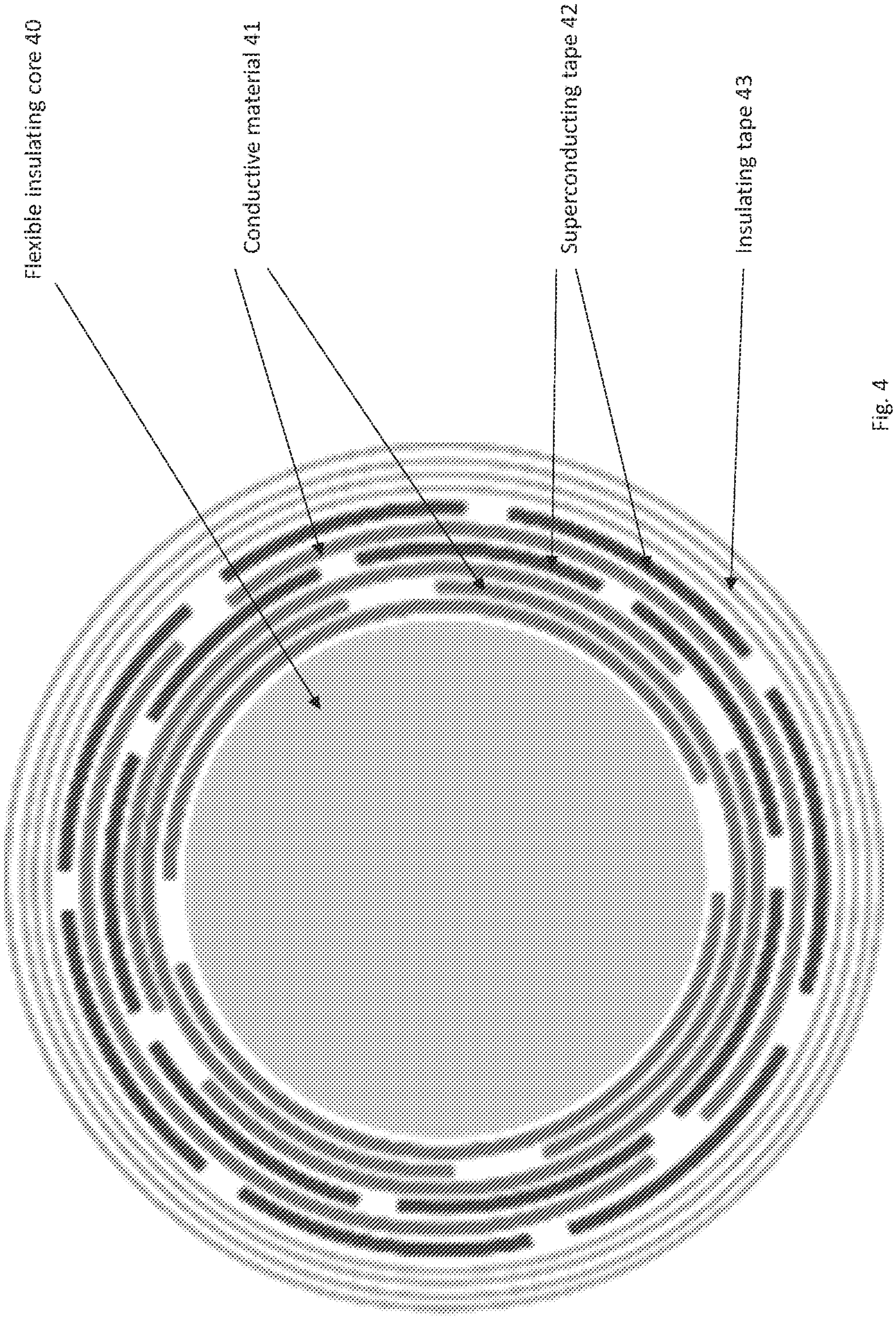
FIG. 4 illustrates in cross-section a cable comprising a flexible insulating core, wrapped conductive metallic tape, wrapped superconducting tape, and an outer wrapped insulating layer in accordance with some examples.

FIG. 4 illustrates in cross-section a cable comprising a flexible insulating core 40, wrapped conductive metallic tapes 41, wrapped superconducting tape 42, and an outer wrapped insulating layer 43 in accordance with some examples. The flexible insulating core 40 may be Kevlar® or Nylon in some cases. Although shown in cross-section, the wrapped-tape nature of the cable can be appreciated from this figure by virtue of the layers being shown as discontinuous sections of a circle. It should be borne in mind that each of the layers is formed of a long, thin tape wrapped helically around the core or the preceding layer. Accordingly, when viewing a given section of tape in cross-section, as one proceeds around the circumference of the cable, that section of tape is in reality extending into/out of the viewed plane whilst also at an ever-increasing (in the direction of wrapping) radius. The helical paths followed by the wrapped tapes can be more easily appreciated with reference to FIGS. 7, 8, and 9 described below. Furthermore, it should be appreciated that at a given radius in the figure, the gaps between the illustrated discontinuous sections of a circle are merely representative and primarily sized in the figure for ease of identification for the viewer. In reality, the gaps may be somewhat smaller. In one example, the conductive metallic tapes are formed of copper, around 100 μm thick and 12 mm wide, and the gap between the preceding turn of tape is around 0.5-2 mm to enable a small, controlled amount of sliding (when the cable flexes). With regard to the layer of conductive material 52 closest to the insulating core 50, the electrical stabilization is provided by woven copper wires around the core and/or layers of copper tapes between the core and the superconducting layers. The outermost layer 43 of the cable in this example is formed by multiple wrappings of polyimide insulating tape to provide electrical insulation and some mechanical protection for the superconducting tape underneath it. As already noted, FIG. 4 is not necessarily to scale.

Figure 5:
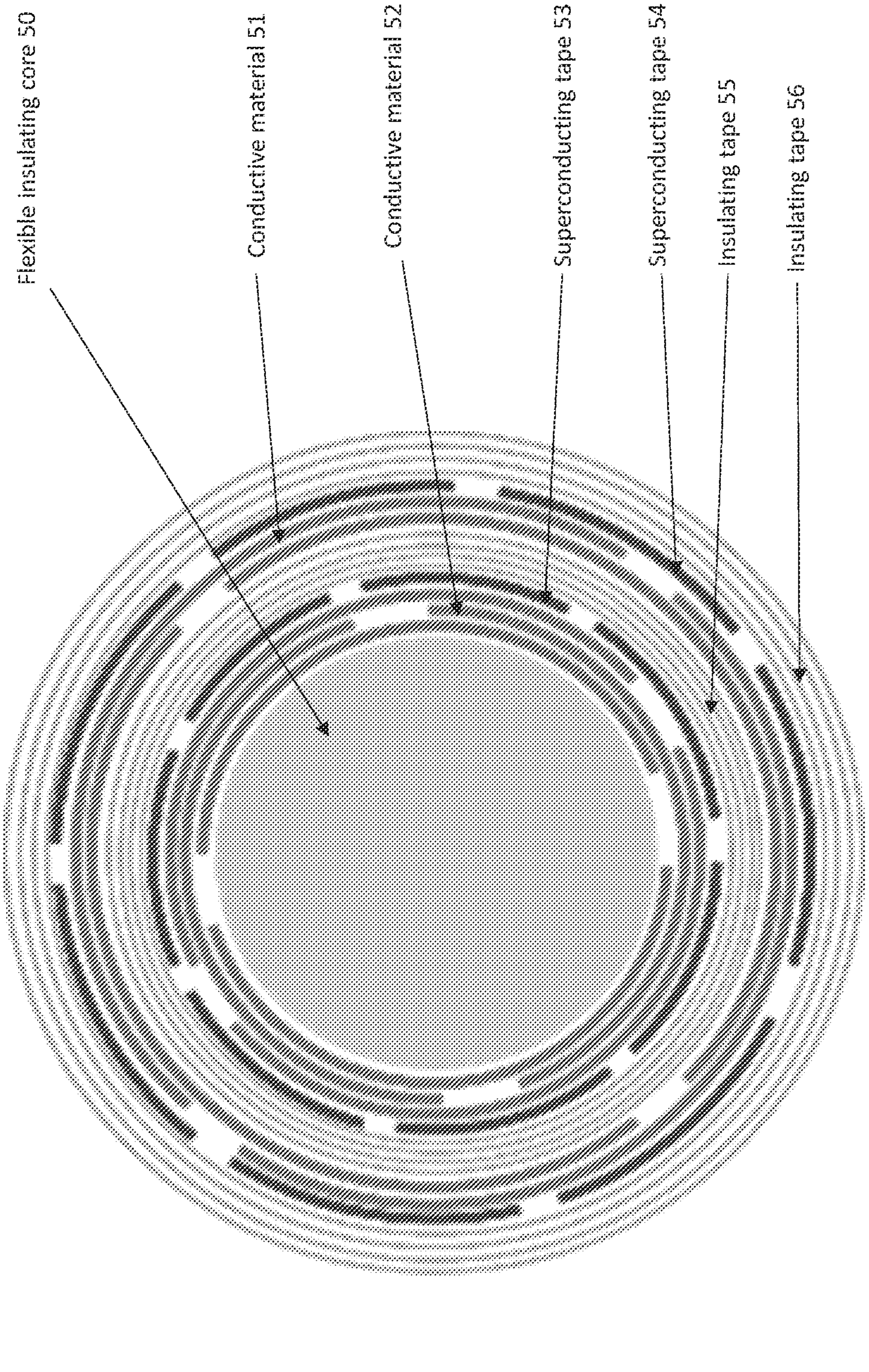
FIG. 5 illustrates in cross-section a cable comprising a flexible insulating core, and two sets of layers of wrapped conductive metallic tape and wrapped superconducting tape, and two layers of wrapped insulating tape in accordance with some examples.

FIG. 5 illustrates in cross-section a cable comprising a flexible insulating core 50, and two sets of layers of wrapped conductive metallic tape 51, 52 and wrapped superconducting tape 53, 54, an inner wrapped insulating tape 55 and an outer wrapped insulating tape 56 in accordance with some examples. The construction of the cable is similar to that of the example of FIG. 4 and the comments made with respect to that figure also apply here. The key difference between the examples of FIGS. 4 and 5 is that in FIG. 5 there are two layers of insulating tape 55, 56. The outermost layer of insulating tape 56 serves the same purpose as that layer 43 in FIG. 4, however the inner layer of insulating tape 55 provides an electrically insulating barrier between the first superconducting tape layer 53 and the second superconducting tape layer 54. Accordingly, the cable of FIG. 5 can provide a co-axial or multi-circuit cable). FIG. 5 is not necessarily to scale.

Figure 6:
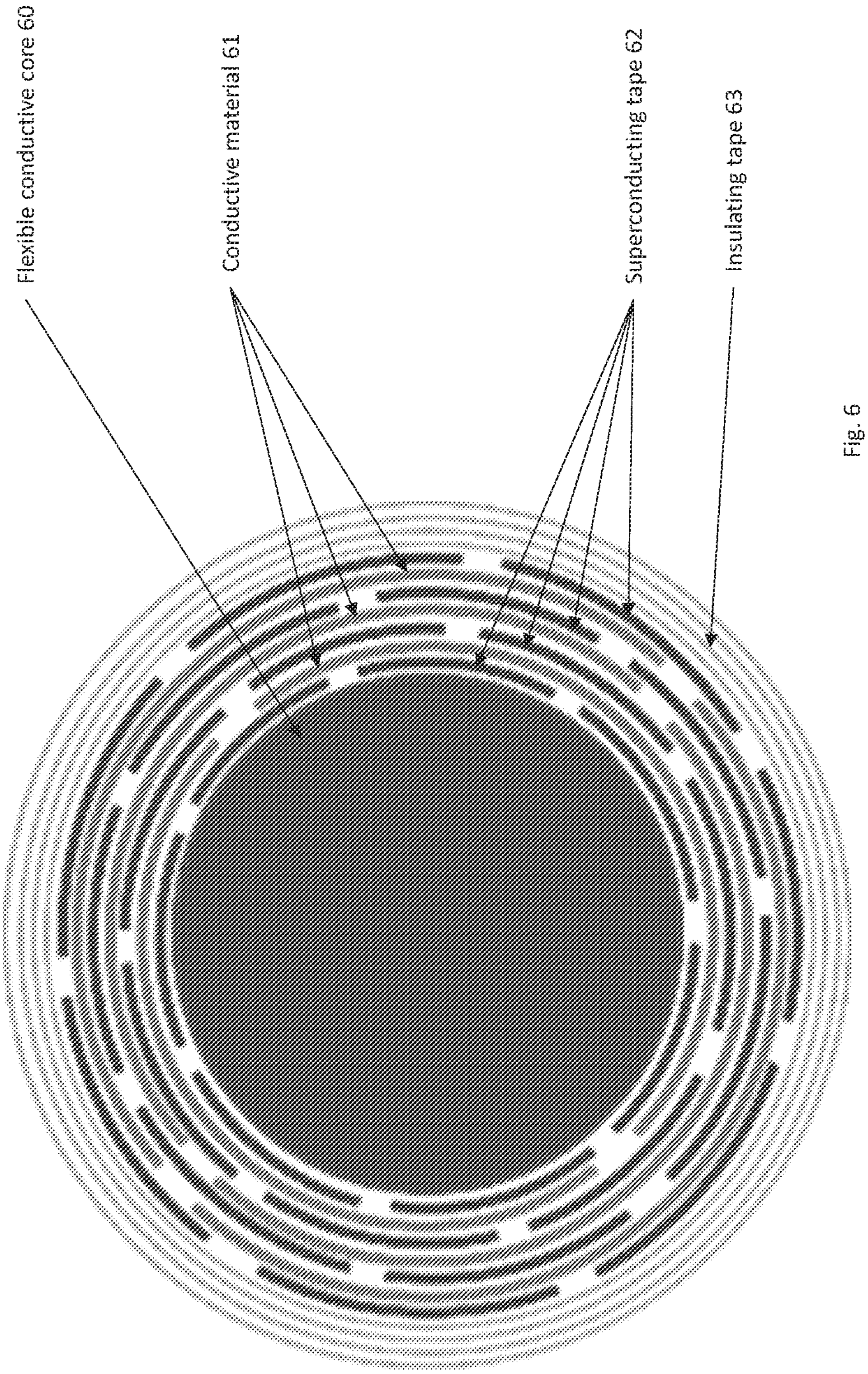
FIG. 6 illustrates in cross-section a cable comprising a flexible conductive core, multiple layers of wrapped conductive metallic tape and wrapped superconducting tape, and an outer wrapped insulating tape in accordance with some examples.

FIG. 6 illustrates in cross-section a cable comprising a flexible conductive core 60, multiple layers of wrapped conductive metallic tape 61 and wrapped superconducting tape 62, and an outer wrapped insulating tape 63 in accordance with some examples. The flexible conductive core 60 in this example is formed of braided copper. A key difference between the example of FIG. 6 and those of FIGS. 4 and 5 is that, where the flexible core is conductive, the first layer of superconducting tape can be wrapped directly onto the core. As such, an outermost region (of arbitrary thickness) of the conductive core serves as the conductive layer onto which the first superconducting tape is helically wrapped. In some cases of this example, the braided strands of the core are tinned to improve further the contact conductivity and the electrical stabilization through the lifetime of the cable. In this example, the construction then comprises alternating layers of conductive material and superconducting tape. The surface of the flexible core 60 is smooth, to avoid degradation of the first layer of superconducting tape, and each further superconducting tape layer is cushioned (and electrically connected/stabilized) by the layer of conductive material around which it is wrapped. The outermost layer 63 of the cable in this example is formed by multiple wrappings of polyimide insulating tape to provide electrical insulation and some mechanical protection for the superconducting tape underneath it. As before, FIG. 6 is not necessarily to scale.

Figure 7:
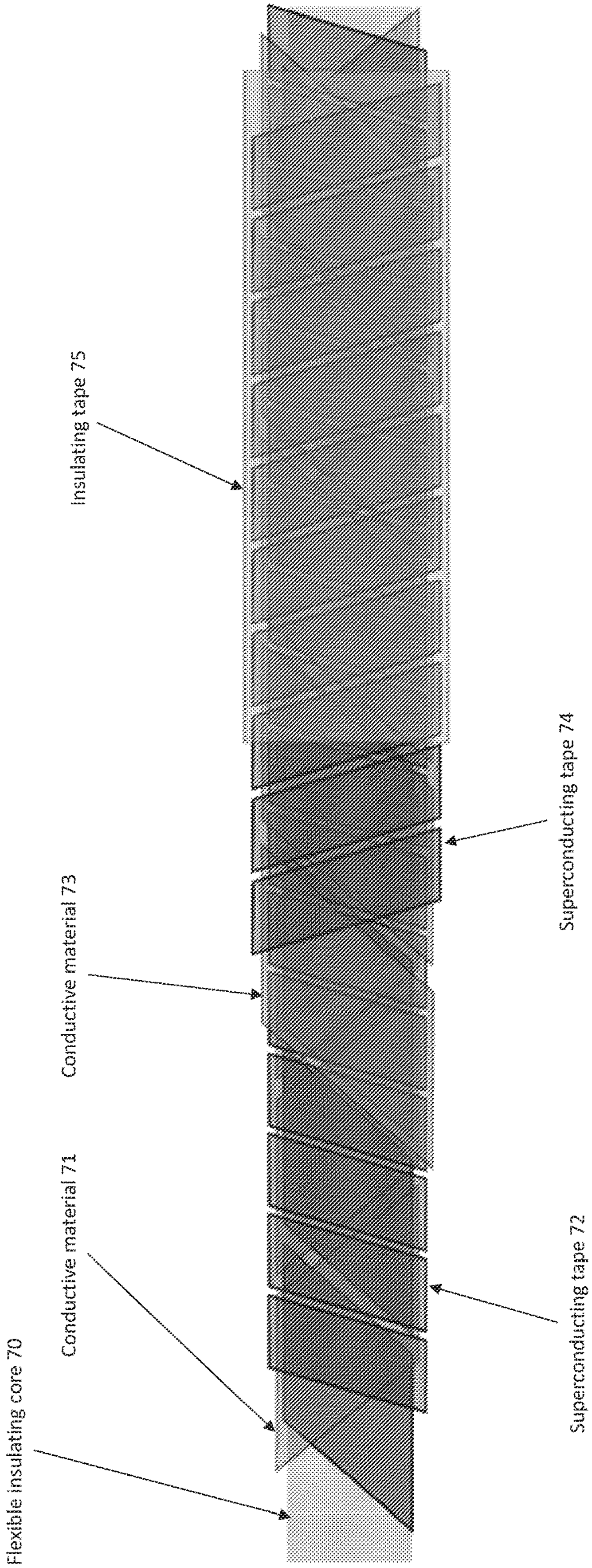
FIG. 7 illustrates in a side-view a cable constructed from a flexible insulating core wrapped with two layers of conductive tape and superconducting tape, and an outer insulating tape layer in accordance with some examples.

FIG. 7 illustrates in a side-view a cable constructed from a flexible insulating core 70 wrapped with two layers of conductive tape 71, 73 and superconducting tape 72, 74 and an outer insulating tape layer 75 in accordance with some examples. The side view of this figure (and FIGS. 8 and 9 that follow) enable the helical wrapping of the various tapes around the core to be more clearly seen. In this example the flexible insulating core 70 is a Kevlar® rope, onto which the tapes are wrapped. In the manufacture of the cable, the tension of the tapes being applied is carefully controlled, such that only small variance in the tension applied (for example, when using some REBCO tapes $\sigma(F)<1.5$ N) is allowed and moreover (as is described further with reference to FIG. 10) the tension is stepped down through a sequence of tension set-points as the layers of tape are built up. The tension limit is defined for the particular tape being wound. This allows cables having multiple layers to be constructed with long (>10 m) length without degradation. The illustrated cable thus comprises the Kevlar® rope core 70, which is first wrapped with copper tape 71 (of the type described above—around 100 μm thick, 12 mm wide, and with turn gaps of around 0.5-2 mm). Note that this first conductive layer 71 comprises (in this example) two "runs" of copper tape, whereby the second run of copper tape is wound in the opposite direction to the first run of copper tape. This counter-winding of the second run enables both the first and second run to have the above-mentioned turn gaps to accommodate a small, controlled amount of sliding, but also ensure full coverage of the core with the conductive material. The first superconducting tape 72 (here formed of REBCO) is then helically wound on top of the first layer of conductive material 71 (itself comprising the two counter-wound copper tapes). Note that it is also counter-wound with respect to the uppermost copper tape of the first layer of conductive material 71. Furthermore, note that the pitch of the helical winding of the first superconducting tape 72 differs (here is less than) the pitch of the helical winding of the copper tape 71. A further (second) layer of conductive material 73 then follows (with the same helical pitch as the first layer of conductive material 71), wound onto the first superconducting tape 72. The second superconducting layer of tape 74 is then counter-wound on the second layer of conductive material 73. The second superconducting layer of tape 74 has its own helical pitch, which differs from both the first superconducting tape 72 and the copper tape 71. Finally the cable is completed by the insulating tape layer 75 provided by multiple windings of Kapton tape. FIG. 7 is not necessarily to scale.

Figure 8:
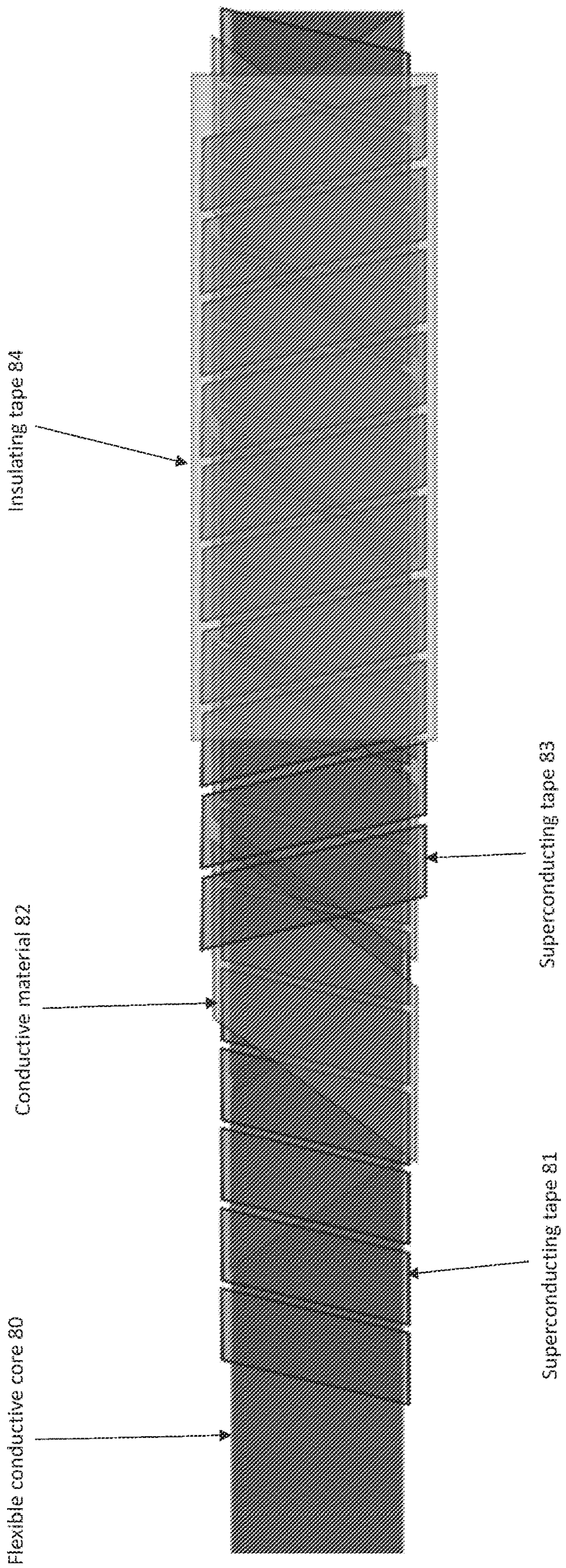
FIG. 8 illustrates in a side-view a cable constructed from a flexible conductive core wrapped with two layers of superconducting tape interposed by a layer of conductive tape, and an outer insulating tape layer in accordance with some examples.

FIG. 8 illustrates in a side-view a cable constructed from a flexible conductive core 80 wrapped with two layers of superconducting tape 81, 83 interposed by a layer of conductive tape 82, and an outer insulating tape layer 84 in accordance with some examples. The key difference to the example of FIG. 7 is that here the flexible core is conductive, in this example being provided by braided copper. Moreover, as in the example of FIG. 6, the conductivity (and smoothness and softness) of the copper core allows the first layer of superconducting tape 81 to be wrapped directly onto the core 80, though as in the case of FIG. 6 the braided strands of the core are pre-tinned to improve further the contact conductivity and the electrical stabilization through the lifetime of the cable. As such, an outermost region (of arbitrary thickness) of the conductive core 80 serves as the conductive layer onto which the first superconducting tape is helically wrapped and the core provides the electrical stabilization for the first layer of superconducting tape 81. A layer 82 of copper tape (as described above for FIG. 7) is wrapped onto the first layer of superconducting tape 81, and a second layer of superconducting tape 83 is then wrapped on top of that. Note that in this example the first layer of superconducting tape 81 and the copper tape layer 82 are wrapped in the same direction, whilst the second layer of superconducting tape 83 is wrapped in the opposite direction. As in the case of FIG. 7, the helical pitch of the windings varies from layer to layer. The cable is completed by the insulating tape layer 84 provided by multiple windings of Kapton tape. FIG. 8 is not necessarily to scale.

Figure 9:
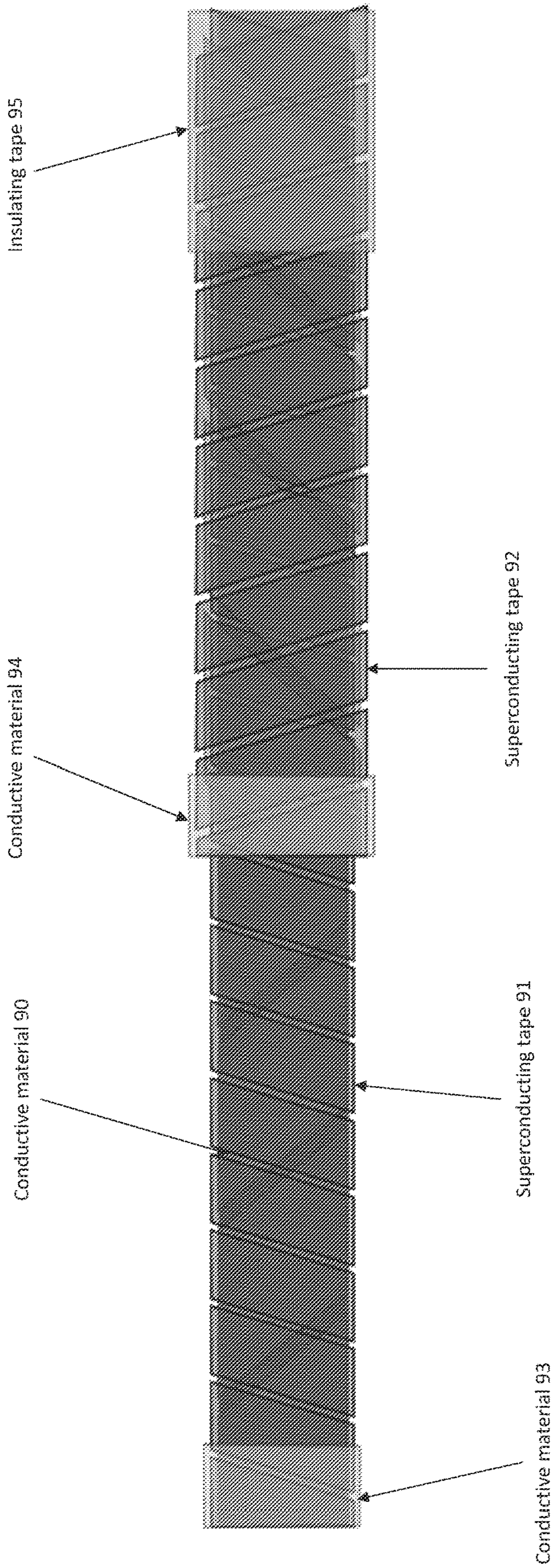
FIG. 9 illustrates in a side-view a cable constructed from a flexible core wrapped with two layers of superconducting tape that overlap one another to form a splice in accordance with some examples.

FIG. 9 illustrates in a side-view a cable constructed from a flexible core wrapped with two layers of superconducting tape that overlap one another to form a splice in accordance with some examples. The core in this example (not directly visible) is made of insulating material and is first wrapped with a layer 90 of conductive material. The first layer of superconducting tape 91 is wrapped on this. A second layer of conductive material (not directly visible) is wrapped onto the first layer of superconducting tape 91. This second layer of conductive material forms the base onto which the second layer of superconducting tape 92 is wrapped. This thus forms a splice, whereby a reliable, low resistance splice of the superconducting tapes (for example each further connected to a distinct HTS cable) are realized by exposing the layers of the cable in a staggered fashion. Similar surface areas for each layer are ideal in order to homogenize the contact resistance of the tapes. As shown in the figure, the superconducting tapes of each layer can be held in place with conductive bands 93, 94 (e.g. thin copper tapes or adhesive copper tape applied in thin rings) around the cable within the splice region. The figure thus shows an HTS cable splice preparation. The prepared cable splice can be soldered into a conductive (e.g. copper) support or tube. It is to be noted that the temperature should not exceed 220° C. during soldering to avoid oxygen loss in the REBCO tapes. Furthermore, in prior art REBCO cables, the REBCO layer is usually oriented toward the inside of the cable. This is because during winding the REBCO is under compression, which is a more favourable condition from a mechanical point of view. However, electrical splices are more challenging, because they have higher resistance for the same surface area due the anisotropy in the electrical properties of the tape. However according to the present techniques the good surface quality of the core and the presence of the conductive buffer layer enable orienting the REBCO toward the outside, thereby reducing the resistance of the splices per surface area. The cable is completed (outside the splice region) by the insulating tape layer 95 provided by multiple windings of Kapton tape. FIG. 9 is not necessarily to scale.

Figure 10:
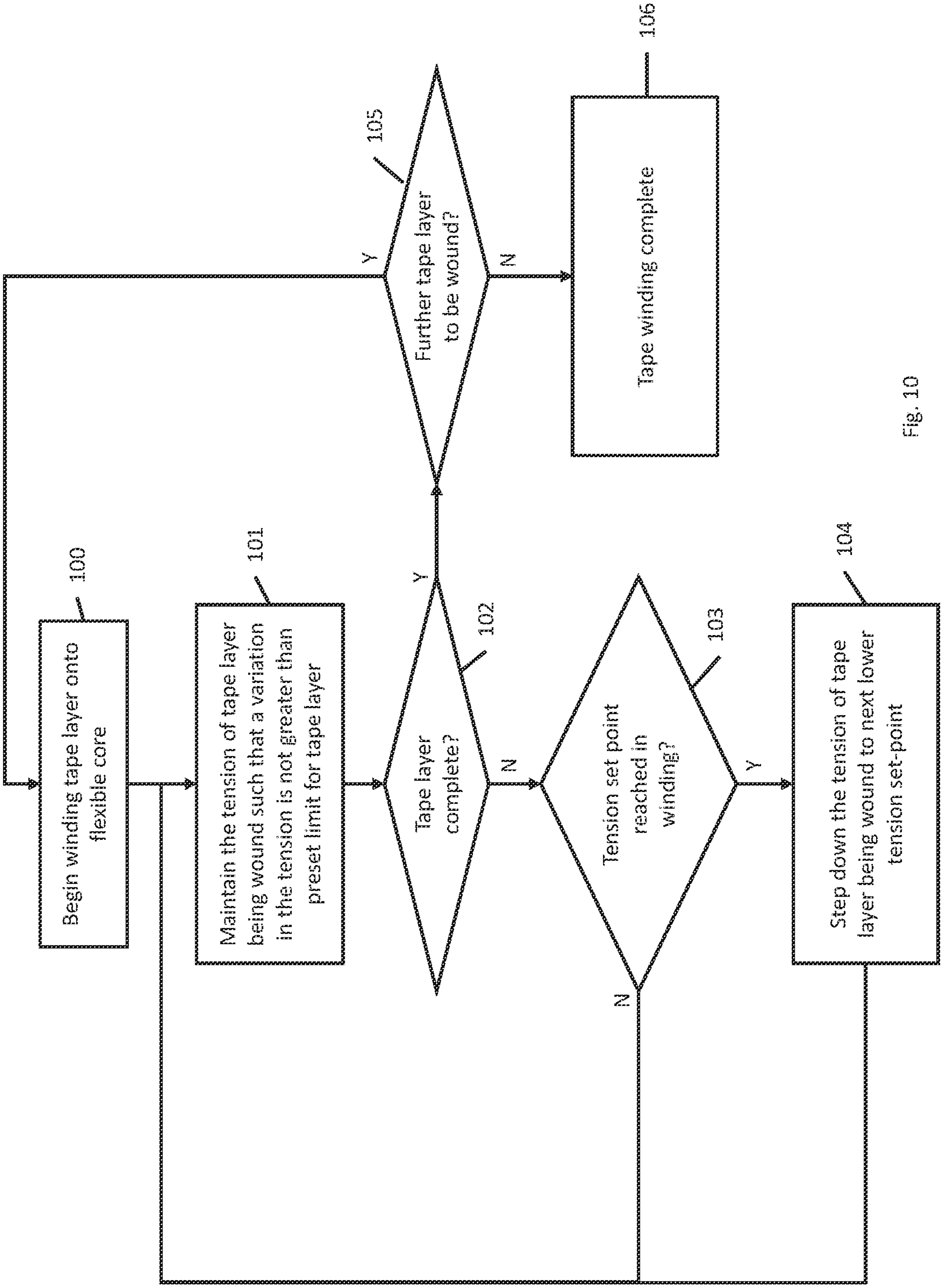
FIG. 10 is a flow diagram showing a sequence of steps which are taken when constructing a cable in accordance with some examples.

FIG. 10 is a flow diagram showing a sequence of steps which are taken when constructing a cable in accordance with some examples. The flow begins at step 100 when the winding of a first tape layer starts. This winding continues, maintaining a predetermined helical pitch and tension, and (step 101) in particular ensuring that the variation in the winding tension $\sigma(F)$ does not exceed a preset limit, which may for example be 1.5 N). It is checked at step 102 if the tape layer is complete and when it has not the flow proceeds to step 103, where it is determined if a tension set point for the winding has been reached. If it has not, the flow returns to step 101 for the tension-controlled winding to continue. However, when a tension set point is reached at step 103, the flow proceeds via step 104 at which the tension of the tape being wound is stepped down to the next predetermined tension set-point. The set of predetermined tension set-points depends on the particular tape being wound (and its corresponding mechanical properties), as well as on the length of tape that has been wound, and/or on the type/characteristics of the cabling machine. The flow then continues via step 101. When at step 102 it is determined that the current tape layer is complete, the flow proceeds to step 105, where it determined if there is another tape layer (of the same or of a different type) to be wound? If there is, the flow returns to step 100 for the winding of that layer (at its own predetermined starting tension) to begin. Once all layers have been wound then the process concludes at step 106.

Various example configurations of the present disclosure are set out in the following numbered clauses:

Clause 1. A cable comprising:

a flexible core;

a conductive layer comprising conductive material; and a superconducting tape wrapped helically around the flexible core and contacting the conductive material.

Clause 2. The cable as defined in Clause 1, wherein the flexible core is metallic.

Clause 3. The cable as defined in Clause 2, wherein the conductive layer is an outer layer of the flexible core.

Clause 4. The cable as defined in Clause 2, wherein the flexible core comprises a multi-stranded conductive cable.

Clause 5. The cable as defined in any of Clauses 2-4, wherein the conductive layer is a tinning layer applied to flexible core.

Clause 6. The cable as defined in Clause 4, wherein the multi-stranded conductive cable comprises strands which are pre-tinned.

Clause 7. The cable as defined in Clause 1, wherein the flexible core is formed of an insulating material.

Clause 8. The cable as defined in Clause 7, wherein the conductive layer comprises braided metallic wires surrounding the flexible core.

Clause 9. The cable as defined in Clause 7, wherein the conductive layer comprises a metallic tape helically wrapped around the flexible core.

Clause 10. The cable as defined in any of Clauses 1-9, wherein a surface roughness of the flexible core has a roughness average value Ra of not more than 3.2 and a mean roughness depth Rz of not more than 325.

Clause 11. The cable as defined in any of Clauses 1-10, wherein the superconducting tape forms part of a first superconducting layer, and the cable further comprises:

at least one intermediate conductive layer surrounding the first superconducting layer; and at least one further superconducting layer wrapped helically around the at least one intermediate conductive layer.

Clause 12. The cable as defined in Clause 11, wherein the at least one intermediate conductive layer comprises further metallic tape helically wrapped around the first superconducting tape.

Clause 13. The cable as defined in any of Clauses 1-12, wherein the superconducting tape forms part of a superconducting layer, and further comprising an insulating layer surrounding the superconducting layer or at least one intermediate conductive layer.

Clause 14. The cable as defined in Clause 13, wherein the insulating layer comprises an insulating tape helically wrapped around the superconducting layer.

Clause 15. The cable as defined in Clause 13 or 14, wherein the superconducting tape is one of multiple superconducting tapes forming a first superconducting layer, and the cable further comprises:

at least one intermediate conductive layer surrounding the insulating layer; and at least one further superconducting tape wrapped helically around the at least one intermediate conductive layer.

Clause 16. The cable as defined in any of Clauses 1-15, wherein the superconducting tape comprises a superconducting layer deposited onto a metallic substrate, wherein the superconducting tape is oriented such that the superconducting layer faces away from the flexible core and the metallic substrate faces towards the flexible core.

Clause 17. The cable as defined in Clause 16, wherein the superconducting tape is a first superconducting tape, and the cable further comprises:

an intermediate conductive layer surrounding the first superconducting tape;

a further superconducting tape wrapped helically around the intermediate conductive layer, wherein the further superconducting tape comprises a further superconducting layer deposited onto a further metallic substrate, wherein the further superconducting tape is oriented such that the further superconducting layer faces towards the flexible core and the further metallic substrate faces away from the flexible core.

Clause 18. A method of producing the cable as defined in any of Clauses 1-17, comprising:

controlling a tension at which at least one of:

the superconducting tape;

the conductive layer;

the at least one intermediate conductive layer; and the at least one further superconducting tape is helically wrapped, such that:

the tension decreases through a series of tension set-points as subsequent layers are helically wrapped.

In brief overall summary cables comprising a flexible core and formed of wound superconducting tape wrapped helically around the flexible core, as well as methods of producing such cables are disclosed. The superconducting tape is wrapped around a conductive layer comprising conductive material, providing mechanical cushioning and electrical stabilization for the superconducting material. When producing such cables, tension control techniques support the protection of the superconducting tape and hence degradation of the superconducting material is largely or entirely avoided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A cable comprising:

a flexible core;

a conductive layer comprising conductive material; and a superconducting tape wrapped helically around the flexible core and contacting the conductive material, wherein a surface roughness of the flexible core has a roughness average value Ra of not more than 3.2 and a mean roughness depth Rz of not more than 325.

2. The cable as claimed in claim 1, wherein the flexible core is metallic.

3. The cable as claimed in claim 2, wherein the conductive layer is an outer layer of the flexible core.

4. The cable as claimed in claim 2, wherein the flexible core comprises a multi-stranded conductive cable.

5. The cable as claimed in claim 2, wherein the conductive layer is a tinning layer applied to flexible core.

6. The cable as claimed in claim 4, wherein the multi-stranded conductive cable comprises strands which are pre-tinned.

7. The cable as claimed in claim 1, wherein the flexible core is formed of an insulating material.

8. The cable as claimed in claim 7, wherein the conductive layer comprises braided metallic wires surrounding the flexible core.

9. The cable as claimed in claim 7, wherein the conductive layer comprises a metallic tape helically wrapped around the flexible core.

10. The cable as claimed in claim 1, wherein the superconducting tape forms part of a first superconducting layer, and the cable further comprises:

at least one intermediate conductive layer surrounding the first superconducting layer; and at least one further superconducting layer wrapped helically around the at least one intermediate conductive layer.

11. The cable as claimed in claim 10, wherein the at least one intermediate conductive layer comprises further metallic tape helically wrapped around the first superconducting layer.

12. The cable as claimed in claim 1, wherein the superconducting tape forms part of a superconducting layer, and further comprising an insulating layer surrounding the superconducting layer or at least one intermediate conductive layer.

13. The cable as claimed in claim 12, wherein the insulating layer comprises an insulating tape helically wrapped around the superconducting layer.

14. The cable as claimed in claim 12, wherein the superconducting tape is one of multiple superconducting tapes forming a first superconducting layer, and the cable further comprises:

at least one intermediate conductive layer surrounding the insulating layer; and at least one further superconducting tape wrapped helically around the at least one intermediate conductive layer.

15. The cable as claimed in claim 1, wherein the superconducting tape comprises a superconducting layer deposited onto a metallic substrate, wherein the superconducting tape is oriented such that the superconducting layer faces away from the flexible core and the metallic substrate faces towards the flexible core.

16. The cable as claimed in claim 15, wherein the superconducting tape is a first superconducting tape, and the cable further comprises:

an intermediate conductive layer surrounding the first superconducting tape;

a further superconducting tape wrapped helically around the intermediate conductive layer, wherein the further superconducting tape comprises a further superconducting layer deposited onto a further metallic substrate, wherein the further superconducting tape is oriented such that the further superconducting layer faces towards the flexible core and the further metallic substrate faces away from the flexible core.

17. A method of producing the cable as claimed in claim 1, comprising:

controlling a tension at which at least one of:

the superconducting tape;

the conductive layer;

the at least one intermediate conductive layer; and the at least one further superconducting tape is helically wrapped, such that:

the tension decreases through a series of tension set-points as subsequent layers are helically wrapped.

18. A cable comprising:

a flexible core;

a conductive layer comprising conductive material; and a superconducting tape wrapped helically around the flexible core and contacting the conductive material, wherein the superconducting tape comprises a superconducting layer deposited onto a metallic substrate, wherein the superconducting tape is oriented such that the superconducting layer faces away from the flexible core and the metallic substrate faces towards the flexible core.

19. The cable as claimed in claim 18, wherein the superconducting tape is a first superconducting tape, and the cable further comprises:

an intermediate conductive layer surrounding the first superconducting tape;

a further superconducting tape wrapped helically around the intermediate conductive layer, wherein the further superconducting tape comprises a further superconducting layer deposited onto a further metallic substrate, wherein the further superconducting tape is oriented such that the further superconducting layer faces towards the flexible core and the further metallic substrate faces away from the flexible core.

* * * * *